Jan. 28, 1941. M. J. LINDSTROM 2,229,750
SHOCK ABSORBER
Filed Dec. 27, 1938 2 Sheets-Sheet 1

Inventor
Morris J. Lindstrom
By Henry Fuchs.
Atty.

Jan. 28, 1941.   M. J. LINDSTROM   2,229,750
SHOCK ABSORBER
Filed Dec. 27, 1938   2 Sheets-Sheet 2
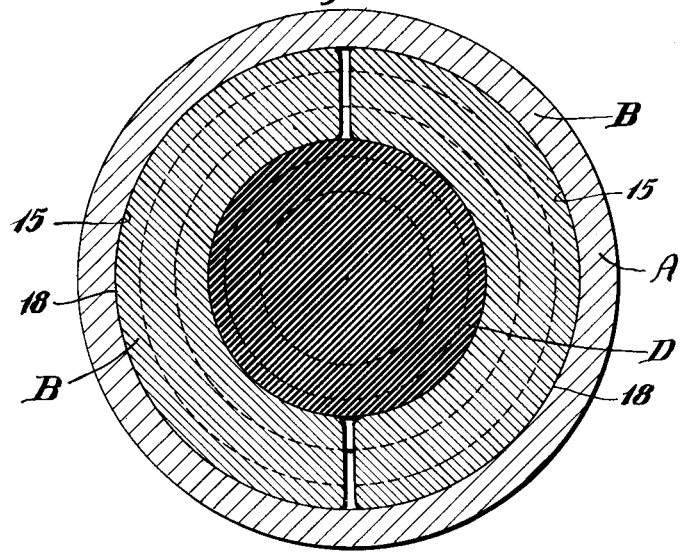
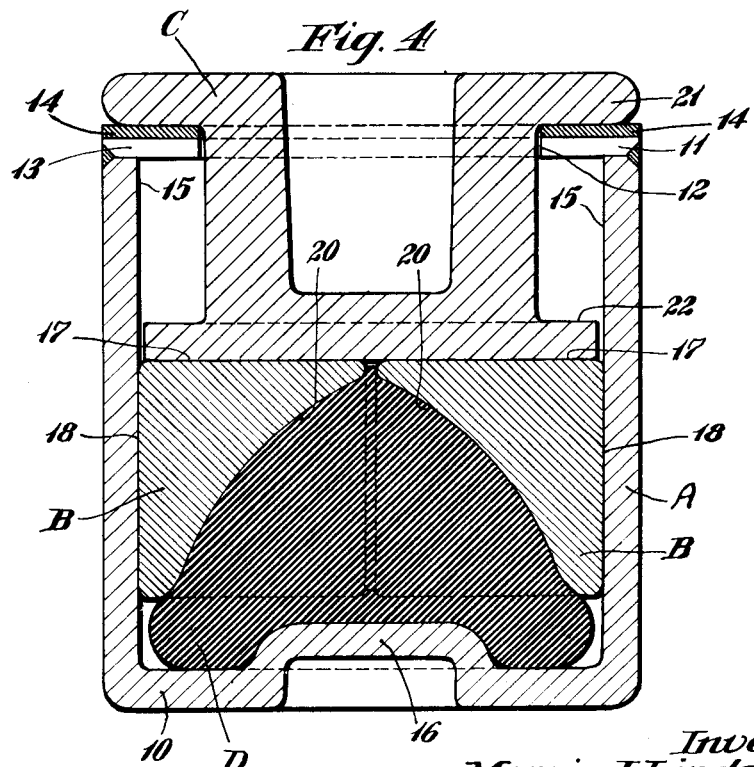
Inventor
Morris J. Lindstrom
By Henry Fuchs
Atty.

Patented Jan. 28, 1941

2,229,750

UNITED STATES PATENT OFFICE 2,229,750

SHOCK ABSORBER

Morris J. Lindstrom, Congress Park, Ill., assignor to W. H. Miner, Inc., Chicago, Ill., a corporation of Delaware Application December 27, 1938, Serial No. 247,738

16 Claims. (Cl. 267—9)

This invention relates to improvements in shock absorbers, and more particularly to shock absorbers for use as snubbing devices in connection with truck springs of railway cars.

One object of the invention is to provide a shock absorber of the friction type, simple in design and efficient in performance, especially adapted for use as a snubber for dampening the action of truck springs of railway cars and replacing at least one of the coil springs of the usual set of springs employed in each cluster of such car trucks.

A more specific object of the invention is to provide a snubber of the character described in the preceding paragraph wherein the frictional resistance is produced by cooperating elements in sliding contact with each other, and relative movement of said elements is yieldingly opposed by a rubber element which also acts to press the friction elements into tight frictional contact with each other.

Other objects of the invention will more clearly appear from the description and claims hereinafter following.

Figure 1:
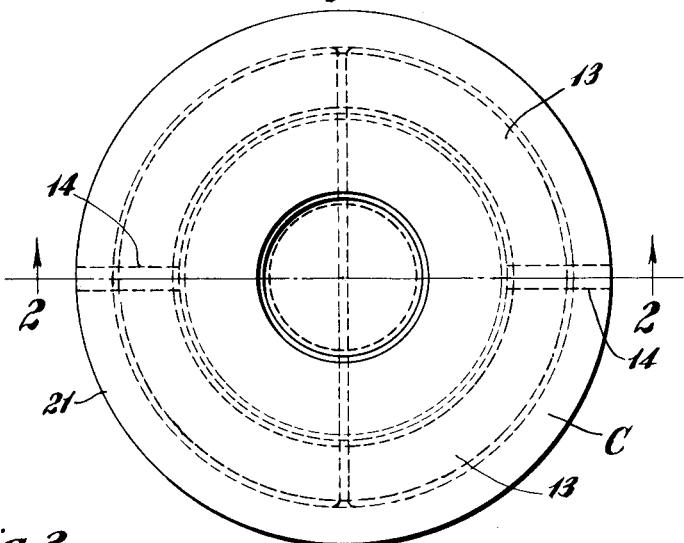
Figure 2:
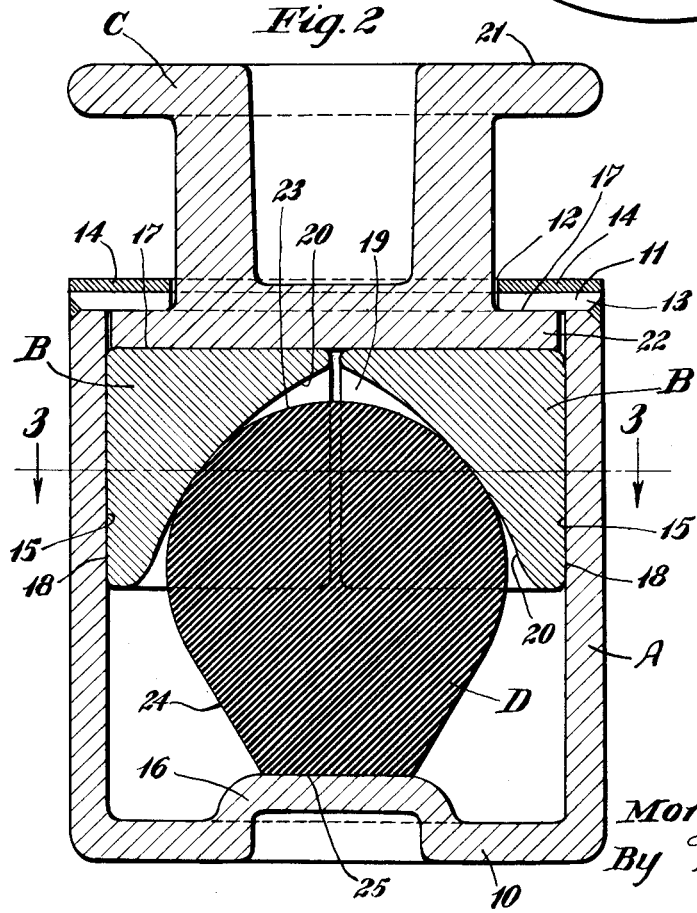

In the drawings forming a part of this specification, Figure 1 is a top plan view of the improved shock absorber or snubbing device embodying my invention. Figure 2 is a transverse, vertical, sectional view, corresponding substantially to the line 2—2 of Figure 1. Figure 3 is a horizontal, sectional view, corresponding substantially to the line 3—3 of Figure 2. Figure 4 is a view similar to Figure 2, showing the mechanism compressed.

My improved shock absorbing or snubbing device comprises broadly a friction casing A; a pair of friction shoes B—B telescoped within the casing; a pressure transmitting member C; and a rubber cushioning element D which also acts as spreading means for the shoes.

The friction casing A is in the form of a cylindrical tubular member, closed by a transverse end wall 10 at its bottom end. At the upper end, the casing A is provided with a transversely disposed wall 11 provided with a central opening 12. The wall 11 is preferably in the form of a two piece ring, the sections 13—13 of which are welded together, as indicated at 14, to form a complete ring. The wall 11 formed by this ring is fixed to the upper end or mouth of the casing in any suitable manner, and as illustrated in the present disclosure is welded to said casing. The opening 12 accommodates the pressure transmitting member C for in and out movement, and, as shown, is of circular outline. The interior of the casing A is of true cylindrical form and of substantially uniform diameter throughout its length or height, and presents interior friction surfaces 15—15 at opposite sides thereof which are truly cylindrical. The bottom wall 10 is provided with an inwardly projecting boss 16, which is substantially centrally disposed and adapted to engage over and accommodate the usual projection or boss commonly provided on the spring follower plate associated with a cluster of truck springs. The casing A is preferably made in the form of a steel casting.

The shoes B—B, which are preferably steel forgings, are of similar design. Each shoe B has a flat top or end face 17 and a transversely curved outer side face 18, which corresponds in curvature to the curvature of the interior of the casing. On the inner side each shoe is cut out, as indicated at 19, providing a concave recess, presenting a concave surface 20. The two shoes B—B are arranged at opposite sides of the casing A with the curved outer faces 18—18 thereof respectively in sliding engagement with the friction surfaces 15—15 of the casing. The recesses 19—19 of said opposed shoes together define a concave pocket of spheroidal form into which the rubber cushioning element extends.

The pressure transmitting member C is in the form of a substantially cylindrical block having top and bottom, or outer and inner, laterally projecting annular flanges 21 and 22. The diameter of the cylindrical body portion of the member C is slightly less than the diameter of the opening 12 of the wall 11 of the casing to provide proper clearance for sliding movement of the pressure transmitting member inwardly and outwardly of the casing. The flange 22 of the member C is of such a diameter as to be slidingly accommodated within the casing A and has shouldered engagement with the inwardly directed portions of the wall 11 of the casing to restrict outward movement of the shoes. The upper end face of the member C is substantially flat and is adapted to bear on the usual upper spring plate employed in connection with truck springs of railway cars. As shown, the member C is preferably hollow, the hollow portion thereof presenting an upwardly opening recess, which serves to accommodate the usual projection or boss with which the spring follower plate of the car truck spring is provided.

The rubber element D is of bulblike form having a ball-shaped upper section 23, a uniformly tapered lower end portion 24, and a substantially flat base 25. The portion 24 is in the form of a truncated cone. The element D is interposed between the shoes B—B and the bottom wall 10 of the casing A and has its flat base seated on the flat top end face of the boss 16 of said bottom wall. The ball-shaped upper section 23 of the element D is seated in the pocket provided by the concave recesses 19—19 and the spherical surface of said ball portion bears on the concave inner faces 20—20 of said shoes. As will be seen upon reference to Figure 2, the concave surfaces 20—20 of the shoes and the cooperating surfaces of said ball-shaped section 23 of the element D are of different curvature, the surfaces 20—20 having the lesser curvature. The ball surface of the element D thus contacts with the shoes substantially midway between the top and bottom ends of the surfaces 20—20, thereby providing clearance to accommodate the flow of the rubber material of the element D at both top and bottom ends of the shoes, as the element D is compressed between the shoes and the bottom wall of the casing.

In assembling the mechanism, the element D and the shoes B—B superimposed thereon are placed within the casing. The pressure transmitting member C is then placed on top of the shoes and the mechanism slightly compressed to bring the bottom flange 22 of the member C within the upper end of the casing. The two sections 13—13 of the ring 11 are then engaged about the cylindrical portion of the member C and welded together, and also welded to the upper end of the casing. In the assembled mechanism the parts are preferably under initial compression.

As will be understood, my improved shock absorbing device when used as a snubber in connection with truck springs of railway cars takes the place of at least one of the usual spring units of each spring cluster of truck springs and is interposed between the truck bolster and spring plank of the truck in the same manner as the spring units. The number of snubbers employed in a spring cluster may be varied to suit conditions, it being evident that, when found desirable, two or more of such devices may be used in each spring cluster. Also a complete cluster of such snubbers may be substituted for the entire spring cluster of the truck.

In the operation of my improved shock absorber or snubber, upon the springs of the cluster of the truck of a railway car being compressed by relative approach of the truck bolster member and the spring plank member, the snubbing unit will also be compressed between these members, thereby moving the pressure transmitting member C inwardly with respect to the casing A and compressing the shoes against the rubber element D. The rubber element D, the material of which is substantially incompressible, is distorted in shape as the shoes move inwardly of the casing, flow of the material of said rubber element being permitted by the clearance provided between the same and the walls of the casing, and also by the clearance provided between the ball-shaped portion of said element and the top and bottom ends of the shoes. As the inner faces 20—20 of the shoes B—B converge outwardly, the rubber element is distorted both longitudinally and transversely, there being in effect a wedging action produced between the inner faces 20—20 of the shoes and the ball-shaped end of the rubber element D. Due to its tendency to return to its original shape, the rubber element D yieldingly resists longitudinal movement of the shoes inwardly of the casing and produces a spreading action on the shoes by lateral outward pressure to force the same apart and against the friction surfaces 15—15 of the casing. The yielding resistance offered by the rubber element D increases as the distortion of said element progresses during compression of the mechanism, thus correspondingly increasing the pressure on the shoes with resultant increase in friction. The friction created between the shoes and the friction surfaces of the casing as the shoes are forced inwardly lengthwise along the friction surfaces 15—15 of the casing by the pressure transmitting member C effectively resist compression of the mechanism to an extent to properly absorb or dampen shocks transmitted thereto. This action of the mechanism continues until it is fully compressed, as shown in Figure 4, when further inward movement of the pressure transmitting member C is limited by the flange 21 thereof coming into engagement with the top end of the casing. The combined frictional and rubber spring resistance of the mechanism thus effectively snubs the action of the springs of the cluster. Oscillation of the springs of said cluster is thus reduced to a minimum by this snubbing action. When the coils of the truck spring cluster expand and the spring follower plates of the cluster are moved apart, the pressure on the member C is reduced, thereby permitting the same and the shoes B—B to move outwardly of the casing A through the action of the rubber element D, which due to its inherent resiliency and tendency to return to its original shape exerts pressure on the shoes in an outward direction with respect to the casing. The parts are thus returned to the normal position shown in Figure 2.

Although as herein shown and described only two friction shoes are employed in the mechanism, the invention is not limited thereto and the number of shoes may be increased, as desired, without departing from the spirit of the invention. Also the invention is not limited to a rubber element of the exact shape shown, it being within the scope of the invention to vary the shape of said element and its surface contour within wide limits so long as it is of a form or shape which offers resistance to longitudinal movement of the shoes and also exerts lateral spreading action on said shoes.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a friction casing having a transverse wall closing one end thereof; of friction shoes telescoped within the casing and having contact with the interior wall of the latter; a unitary, deformable element composed entirely of rubber within the casing interposed between said shoes and buttressed against said end wall of the casing resisting both lateral approach and inward movement of said shoes; and means directly engaged with said shoes for transmitting longitudinal sliding movement thereto.

2. In a friction shock absorbing mechanism, the combination with a friction casing; of friction shoes telescoped within the casing and having contact with the interior wall of the latter, said shoes being movable inwardly of the casing lengthwise thereof; a deformable element composed entirely of rubber, disposed within the casing yieldingly opposing relative movement of the casing and casing, said element and shoes having abutting faces for transmitting pressure from one to the other in directions both longitudinal and transverse of the mechanism; and pressure transmitting means cooperating with said shoes.

3. In a friction shock absorbing mechanism, the combination with a friction casing; of laterally opposed friction shoes slidable on the interior wall of the casing, said shoes having interior opposed pressure transmitting faces converging outwardly of the mechanism; a pressure transmitting member engaging the outer ends of the shoes; and a distortable rubber element extending between said shoes and having bearing engagement with the interior faces of said shoes and with the casing to oppose relative movement of the casing and shoes and yieldingly oppose relative lateral approach of said shoes.

4. In a friction shock absorbing mechanism, the combination with a friction casing having a closed end; of opposed friction shoes slidable in said casing; a pressure transmitting member engaged with the outer ends of said shoes; and a deformable element entirely composed of rubber interposed between the closed end of the casing and the shoes, said element being buttressed at one end against said closed end of the casing and having its other end projecting between and buttressed against said shoes.

5. In a friction shock absorbing mechanism, the combination with a friction casing having a closed end; of opposed friction shoes slidable in said casing; a pressure transmitting member engaged with the outer ends of said shoes; and a deformable rubber element extending between said shoes and bearing on said closed end of the casing, said shoes having forwardly converging opposed inner faces bearing on said rubber element.

6. In a friction shock absorbing mechanism, the combination with a friction casing having one end closed; of opposed friction shoes at the other end of the casing slidable lengthwise on the interior wall of said casing, said shoes having forwardly converging, opposed, inner faces; means for transmitting pressure to said shoes to move the same lengthwise of the casing; and a rubber element interposed between said shoes and the closed end of the casing, said element having a portion projecting between said shoes, said portion having forwardly converging side faces engaged between the converging faces of the shoes.

7. In a friction shock absorbing mechanism, the combination with a friction casing having one end closed; of opposed friction shoes at the other end of the casing in sliding engagement with the interior wall thereof, said shoes having forwardly converging, concave, opposed, inner faces; means for transmitting longitudinal movement to said shoes; and a rubber element within said casing bearing on said closed end and extending between said shoes, said element having forwardly converging, convex side faces in engagement with the concave faces of said shoes.

8. In a friction shock absorbing mechanism, the combination with a friction casing; of a pressure transmitting member; opposed shoes slidable in said casing and bearing on said member; and a deformable rubber element within said casing opposing relative movement of the casing and shoes, said element having a rounded portion extending between said shoes, and said shoes having opposed, forwardly converging, inner faces bearing on said rounded portion of said element.

9. In a friction shock absorbing mechanism, the combination with a friction casing having an abutment wall at one end; of laterally opposed friction shoes slidable in the other end of the casing, said shoes having outwardly converging, opposed faces on the inner sides thereof; an elongated deformable rubber element buttressed against said abutment wall and interposed between the same and said shoes, said element extending between said shoes, the extending portion thereof being of ball shape and bearing on said inner faces of the shoes; and means for transmitting longitudinal pressure to said shoes.

10. In a friction shock absorbing mechanism, the combination with a friction casing having an abutment wall at one end; of laterally opposed friction shoes slidable in the other end of the casing, said shoes having opposed inner faces converging outwardly toward said last named end of the casing; a bulb-shaped deformable rubber element interposed between the shoes and said abutment wall and bearing on the latter, a portion of said element extending between said shoes in engagement with said outwardly converging faces; and means for transmitting longitudinal movement to said shoes.

11. In a friction shock absorbing mechanism, the combination with a friction casing closed at one end by a transverse abutment wall; of opposed friction shoes at the other end of the casing in sliding engagement with the inner wall thereof, said shoes having opposed, forwardly converging inner faces; a bulb-shaped, deformable rubber element having a flat base, said element being interposed between said shoes and the abutment wall of said casing, and having its base bearing on said abutment wall, said element extending between said shoes and bearing on the forwardly converging faces of said shoes; and means for transmitting inward pressure to said shoes.

12. In a friction shock absorbing mechanism, the combination with a friction casing closed at one end by a transverse wall; of opposed friction shoes slidable in the other end of said casing, said shoes having concave pockets in opposed sides thereof; a deformable rubber element having a ball portion seated in said pockets, said element being buttressed against said transverse wall of the casing; and means for forcing said shoes to move inwardly of the casing.

13. In a friction shock absorbing mechanism, the combination with a cylindrical friction casing having opposed interior cylindrical friction surfaces; of opposed friction shoes within the casing having curved friction surfaces engaging the friction surfaces of the casing, said shoes having opposed inner faces converging forwardly of the mechanism; a deformable rubber element in said casing opposing inward movement of the shoes, said element having a rounded bulb-shaped portion extending between said shoes and engaging said converging faces; and a member for transmitting pressure to the shoes.

14. In a friction shock absorbing mechanism, the combination with a cylindrical friction casing closed at one end by a transverse abutment wall and having laterally opposed interior transversely curved friction surfaces at the other end thereof; of transversely opposed friction shoes within the casing having curved outer friction surfaces slidably engaged with said casing friction surfaces; a deformable rubber element in said casing bearing at one end on said abutment wall, and having the other end extending between said shoes, said last named end being ball-shaped, said shoes having forwardly converging concave faces on the inner sides thereof bearing on said ball-shaped end of said element; and means for transmitting pressure to said shoes to move the same inwardly of the casing.

15. In a friction shock absorbing mechanism, the combination with a casing closed at one end by a transverse abutment wall; of transversely opposed friction shoes in sliding engagement with the interior of the other end of said casing, said shoes having opposed inner faces converging outwardly of the mechanism, said faces being curved lengthwise; a deformable rubber element seated at one end on said abutment wall and having the other end engaged between said inner faces of said shoes, said last named end being provided with outwardly converging side faces cooperating with the inner faces of said shoes, said side faces being curved longitudinally, the curvature of said last named faces being greater than the curvature of said inner faces of the shoes; and means for transmitting pressure to said shoes in a direction lengthwise of the casing.

16. In a friction shock absorbing mechanism, the combination with a casing; of transversely opposed shoes in sliding engagement with the interior of said casing, said shoes having forwardly converging interior side faces of concave form; a deformable rubber element within the casing opposing inward movement of said shoes, said element having a portion disposed between said shoes and having convex, forwardly converging side faces engaging respectively the concave faces of said shoes, the curvature of said convex faces being greater than the curvature of said concave faces; and a pressure transmitting member bearing on the outer ends of said shoes.

MORRIS J. LINDSTROM.